United States Patent [19]
Fujimura et al.

[11] Patent Number: 5,974,490
[45] Date of Patent: Oct. 26, 1999

[54] PLURAL DISK UNIT APPARATUS PROVIDING HIGH-DENSITY MOUNTING OF DISK UNITS AND PERIPHERAL UNITS

[75] Inventors: Atsushi Fujimura, Ebina; Kazuo Morita, Hadano, both of Japan

[73] Assignee: Hitachi, Ltd. and Hitachi Information Technology Co., Ltd., Tokyo, Japan

[21] Appl. No.: 08/754,126

[22] Filed: Nov. 22, 1996

[30] Foreign Application Priority Data

Nov. 24, 1995 [JP] Japan .................................. 7-306310

[51] Int. Cl.⁶ ............................................ G06F 13/00
[52] U.S. Cl. ...................... 710/103; 710/102; 711/114; 711/115
[58] Field of Search .................................. 395/283, 281, 395/282, 280; 711/144, 115; 710/103, 101, 102, 100

[56] References Cited

U.S. PATENT DOCUMENTS

| | | | |
|---|---|---|---|
| 4,504,821 | 3/1985 | Barnes | 340/146.2 |
| 4,836,791 | 6/1989 | Grabbe et al. | 439/79 |
| 5,051,849 | 9/1991 | Fukushima et al. | 360/69 |
| 5,245,508 | 9/1993 | Mizzi | 361/694 |
| 5,600,783 | 2/1997 | Kakuta et al. | 395/182.04 |
| 5,682,509 | 10/1997 | Kabenjian | 395/309 |

OTHER PUBLICATIONS

D.A. Patterson et al, "A Case for Redundant Arrays of Inexpensive Disks (RAID)", Computer Science Division, Department of Electrical Engineering and Computer Sciences, University of California, Berkley, 1988.

*Primary Examiner*—Glenn A. Auve
*Assistant Examiner*—Ario Etienne
*Attorney, Agent, or Firm*—Fay, Sharpe, Beall, Fagan, Minnich & McKee

[57] ABSTRACT

A mother board provided in a plural disk unit, which is formed with an interconnection pattern containing high speed control buses such as SCSI buses, is disposed at the central portion of a housing. A plurality of disk units capable of being removably inserted by plugging are directly mounted on the front side of the mother board through bus connectors, while connector units for external connection and having connectors of the control buses, terminal units having terminal circuits of the control buses, power units for supplying power to the disk units, and fan connectors having fans for cooling the interior of the housing are directly mounted on the back side of the mother board through connectors. Interconnections between the units are all contained in the interconnection pattern formed on the mother board. The entire plural disk unit is thus integrated.

29 Claims, 15 Drawing Sheets

PLURAL DISK UNIT APPARATUS PROVIDING HIGH-DENSITY MOUNTING OF DISK UNITS AND PERIPHERAL UNITS

BACKGROUND OF THE INVENTION

1. Field of the Invention

The present invention relates to apparatus employing plural disk units, and particularly to a technology which is effectively applied to a mounting process or the like in a plural disk unit apparatus that includes a plurality of disk units controlled through a bus connection.

2. Description of the Related Art

In rotating external memories such as magnetic disk apparatus used for information processing systems, there is a continuing need for increased storage capacity and reliability, yet at a reduced cost. To meet such demands, a disk array (for example, as described in Pattersonc et al, "A Case for Redundant Arrays of Inexpensive Disks (RAID)", Report No. UCB/CSD 87/391, Computer Science Div., University of California, Berkeley, 1987) having a large capacity and highly reliable external memory has been devised, which is composed of a plurality of small rotating memories which are effectively integrated.

This plural disk unit has a limited disk unit-mounting density due to a load interval (interval between adjacent disk units connected to a small computer system integration (SCSI, or "scuzzy") control bus) problem. More concretely, the SCSI bus most commonly used for a plural disk unit must be designed so that the tap-off length from the bus line is shortened, to ensure a high-speed control bus signal; however, the tap-off length must be somewhat long so that the disk unit is connected to the SCSI bus by a single connector, but when the tap-off length is excessively long, data loss occurs because the pulse of a signal switched to high speed is disturbed by a reflected wave. In particular, the relationship between load interval and tap-off length is important; that is, the load interval must be sufficiently larger than the tap-off length.

There are at least two methods by which to satisfy the relationship between the load interval and tap-off length in high density mounting. One method shortens the tap-off length by providing two control bus connectors on each disk unit and connecting the individual disk units substantially in series to the control bus, and the other increases the load interval by connecting adjacent disk units one after another by means of a flat cable. The former method, however, is disadvantageous in that the provision of two connectors for each disk unit obstructs the high density mounting of the disk units and increases the cost. On the other hand, the latter method is disadvantageous in that connection between disk units one after another does not allow the connectors to be inserted and removed easily; hence, the disk units cannot by easily exchanged by plugging, thus reducing the maintainability of the apparatus.

The entire plural disk unit cannot be adequately miniaturized solely by integrating the disk units; miniaturization must include a general integration of disk units and peripheral units such as power supplies, cooling units, and the like. Furthermore, any attempt at miniaturization requires an effective plan to cool the plural disk unit because heat generation is concentrated for high-density disk units.

Another consideration in the design of a plural disk unit apparatus is the need for uninterruptible operation and high processing speed. To this end, attempts have been made to share a plural disk unit among a plurality of host computers, and to provide uninterruptible operation and uninterruptible maintenance of the plural disk unit itself.

SUMMARY OF INVENTION

An object of the present invention is to provide a plural disk unit apparatus that can realize both high speed operation and high density mounting of a plurality of disk units.

Another object of the present invention is to provide a miniature plural disk unit including not only a plurality of disk units but also peripheral units, and to reduce the installation space of the plural disk unit.

A further object of the present invention is to provide a plural disk unit apparatus in which a plurality of disk units and peripheral units can be inserted or removed by plugging without degradation of operational reliability.

A further object of the present invention is to provide a plural disk unit apparatus having improved maintainability and operation efficiency, and to realize uninterruptible operation by inserting or removing a plurality of disk units and peripheral units by plugging.

A further object of the present invention is to provide a plural disk unit apparatus that can easily share a plurality of disk units among a plurality of hosts.

A further object of the present invention is to provide a plural disk unit apparatus that easily adjusts the processing performance of a control bus by making variable the number of channels for controlling control buses connected to a plurality of disk units.

A further object of the present invention is to provide a plural disk unit apparatus having improved control bus processing performance, by distributing the control bus into a plurality of channels when the processing performance of the control bus is insufficient.

According to a plural disk unit apparatus of the present invention, a mother board having an interconnection pattern containing control buses and the like is provided at the center of the apparatus. A plurality of disk units capable of being removably inserted by plugging are directly mounted on the front surface side of the mother board through connectors provided on the mother board; while connector units having connectors for the control buses, terminal units having terminal circuits of the control buses, power units for supplying power to the disk units, and fan units having fans for cooling the interior of the apparatus are directly mounted on the back surface side of the mother board through the connectors on the mother board. The connection between all of the units is performed by the interconnection pattern formed on the mother board, to thus integrate the entire apparatus.

Disk units belonging to the same control group are connected to multiple control buses, and a cross-call circuit for processing respective accesses from the control buses can be provided on each disk unit.

To enable exchange of disk units by plugging, a precharge line can be provided on the mother board to precharge the floating capacitance of a disk unit upon its insertion. A current control circuit for controlling the current on the precharge line can be provided on an arbitrary unit other than the disk units (e.g., an arbitrary peripheral unit). Further, a connection sequence control mechanism for connecting the precharge line before connection of the power line upon insertion of the disk unit, and for connecting an input/output enable signal line for a control bus signal after connection of the other control bus signal lines, can be provided on the bus connector of the mother board. The same means can be provided for the fan unit which is one of the peripheral units. Each disk unit can be provided with a circuit for detecting and displaying a motor stopping command transmitted to the disk unit.

To stabilize the high speed operation of the control bus, an interconnection pattern can be provided on the mother board to adjust the load interval by selectively detouring signal line paths for specified control bus signals.

To allow atmospheric air to be in direct contact with the disk units to assist in cooling the disk units, the front and rear surface sides of the housing can be formed with a suction port and a discharge port, respectively, wherein cooling air is sucked from the front surface side of the mother board for cooling the disk units provided on the front surface, passing through the power units provided on the back surface, and is forcibly discharged by the fan units through the discharge port.

The terminal unit and the connector unit can be disposed adjacent to each other on the back surface side of the mother board, and replaced with a bus connection unit as needed.

DETAILED DESCRIPTION OF THE PREFERRED EMBODIMENTS

Figure 1:
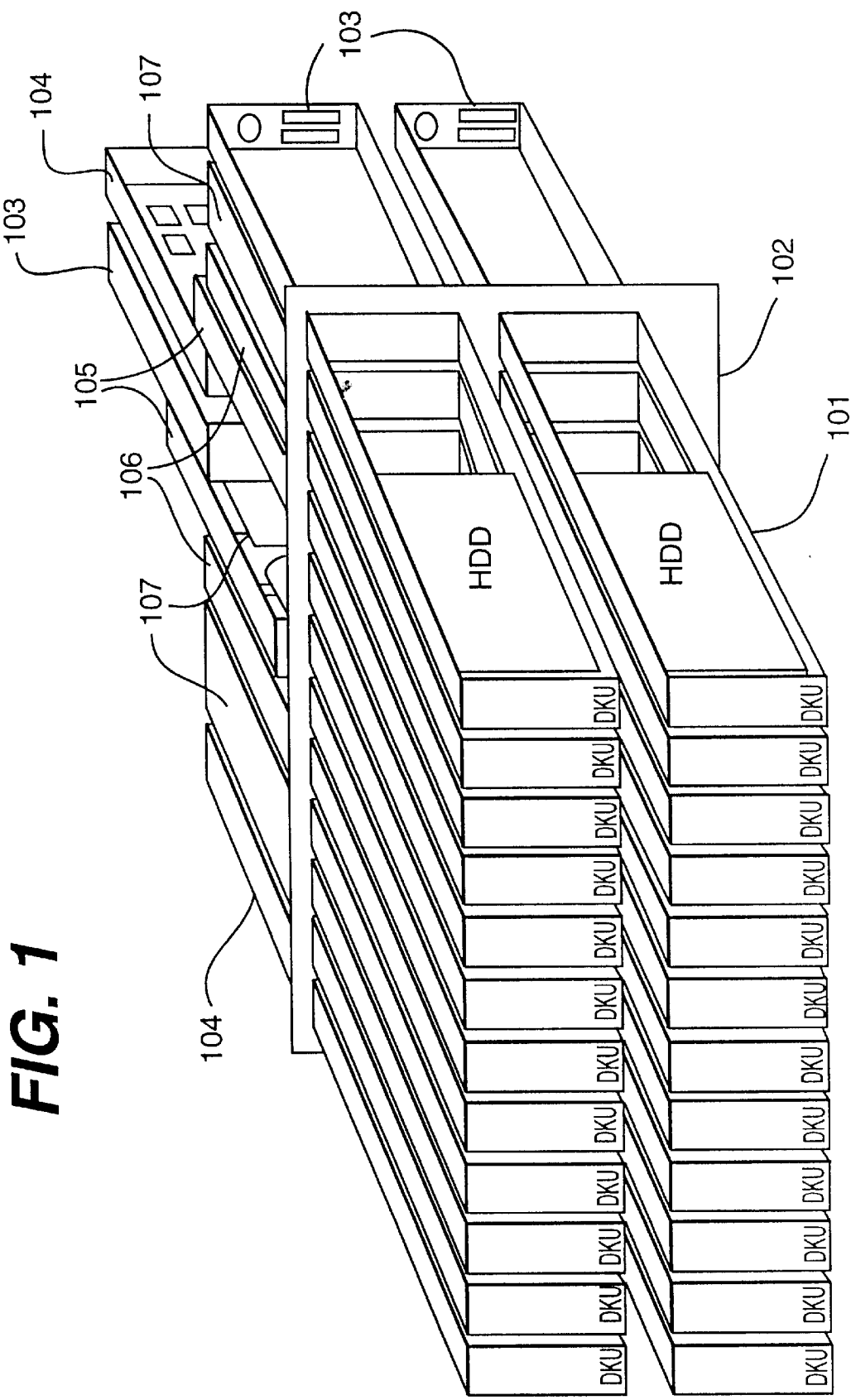
FIG. 1 is a perspective view showing an internal mounting state in a plural disk unit according to one embodiment of the present invention.

In the following description for this embodiment, a SCSI bus is used as a control bus.

As shown in FIG. 1, FIGS. 2(a)–2(d), and FIGS. 3(a)–3(b), a mother board 102 disposed at a central portion of a housing 100 has a plurality of connectors 102c disposed on a front surface 102a and a back surface 102b of the mother board 102. Connectors 101a, 103a (mother board connector), 104a, 105a, 106a, 107a, and 108a are respectively provided on a disk unit 101, connector unit 103 of the control bus, terminal unit 104 of the control bus, 5V power unit 105, 12V power unit 106, AC-DC power unit 107, and fan unit 108. These connectors can be each removably inserted into the connectors 102c of the mother board 102.

Figure 2A:
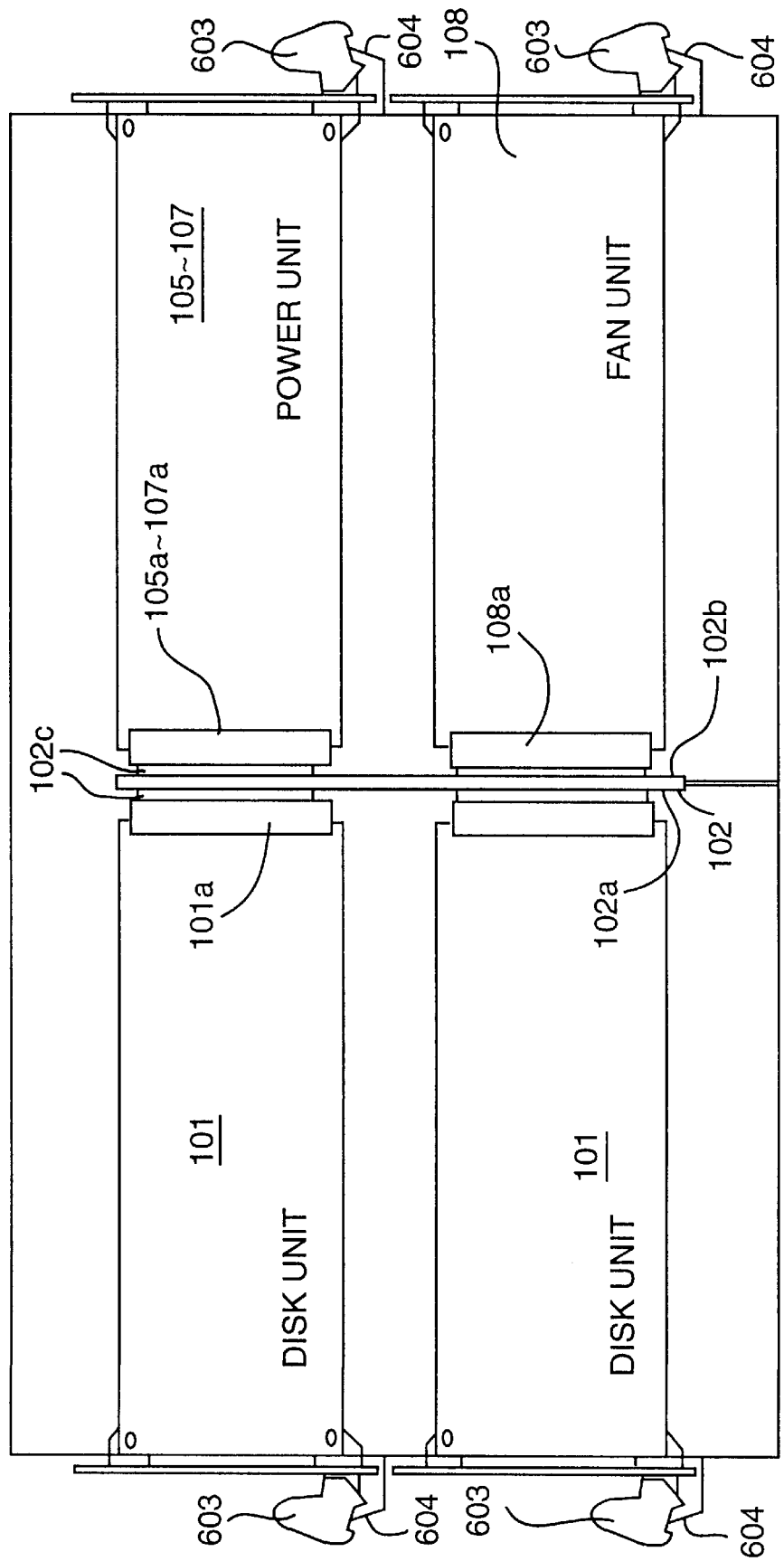
FIG. 2(a) is a side view of the plural disk unit shown in FIG. 1.
Figure 2C:
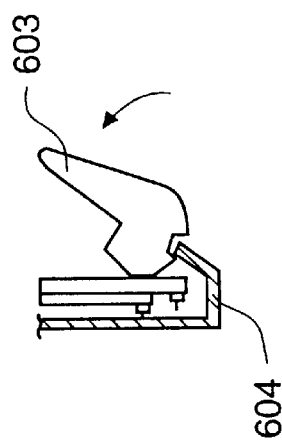
FIGS. 2(b)–2(d) show details of the locking mechanism of FIG. 2(a)
Figure 2D:
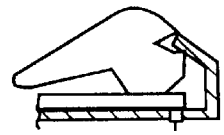
Figure 2B:
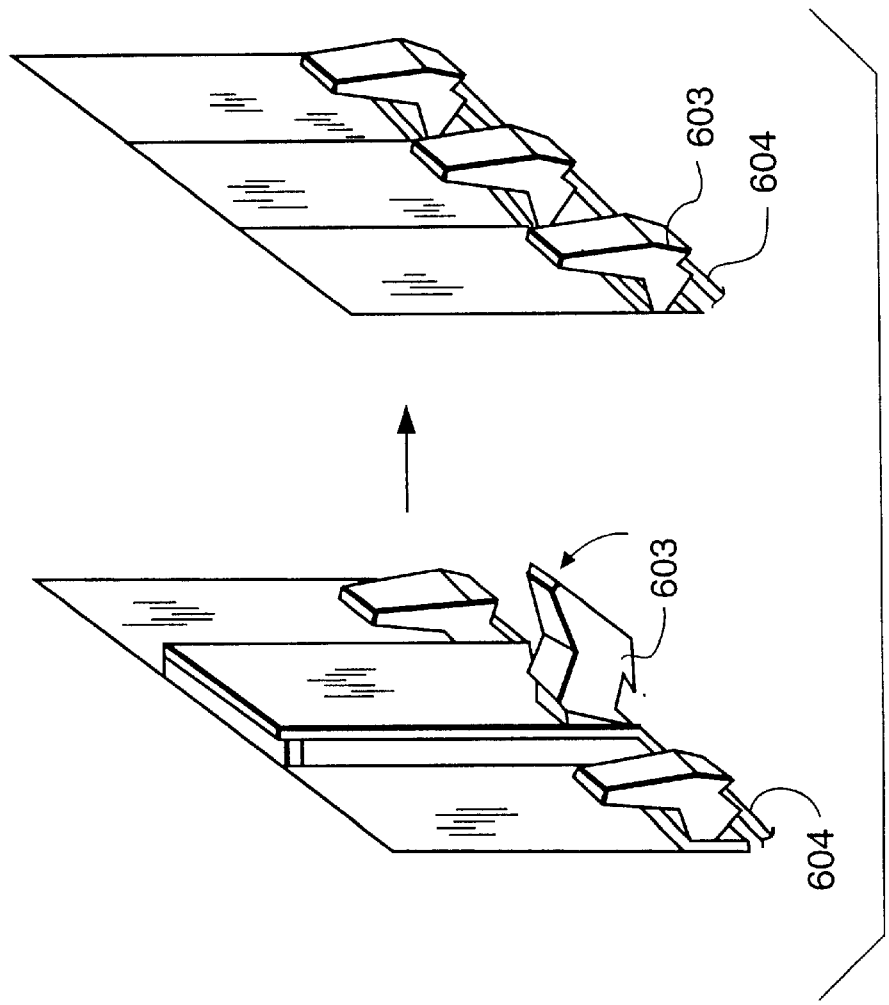
Figure 3A:
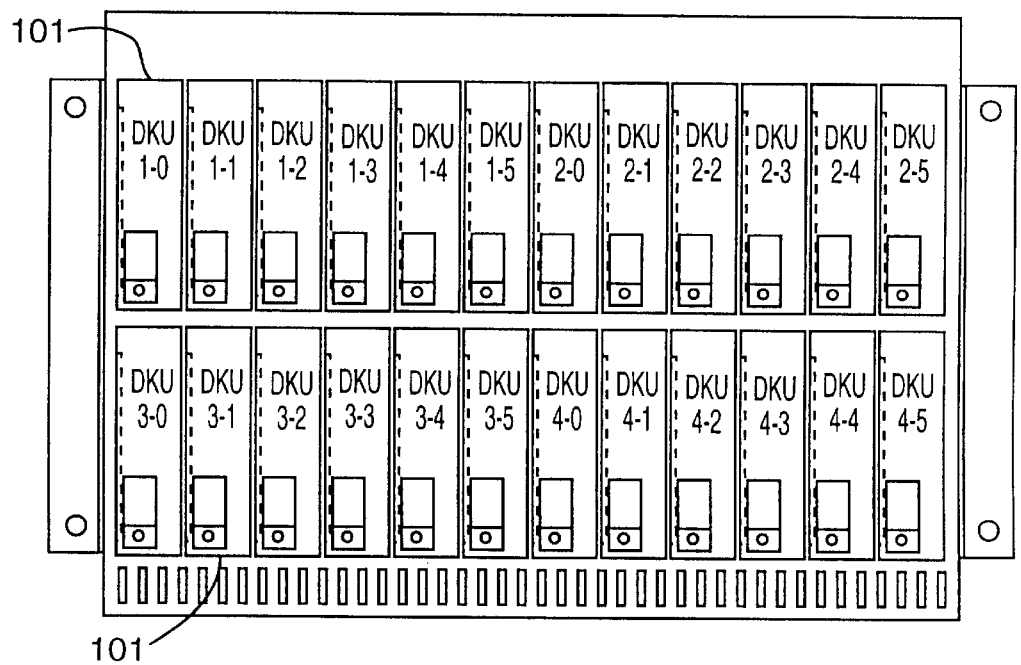
FIGS. 3(a) and 3(b) are front and rear views showing the internal mounting state in the plural disk unit shown in FIG. 1.
Figure 3B:
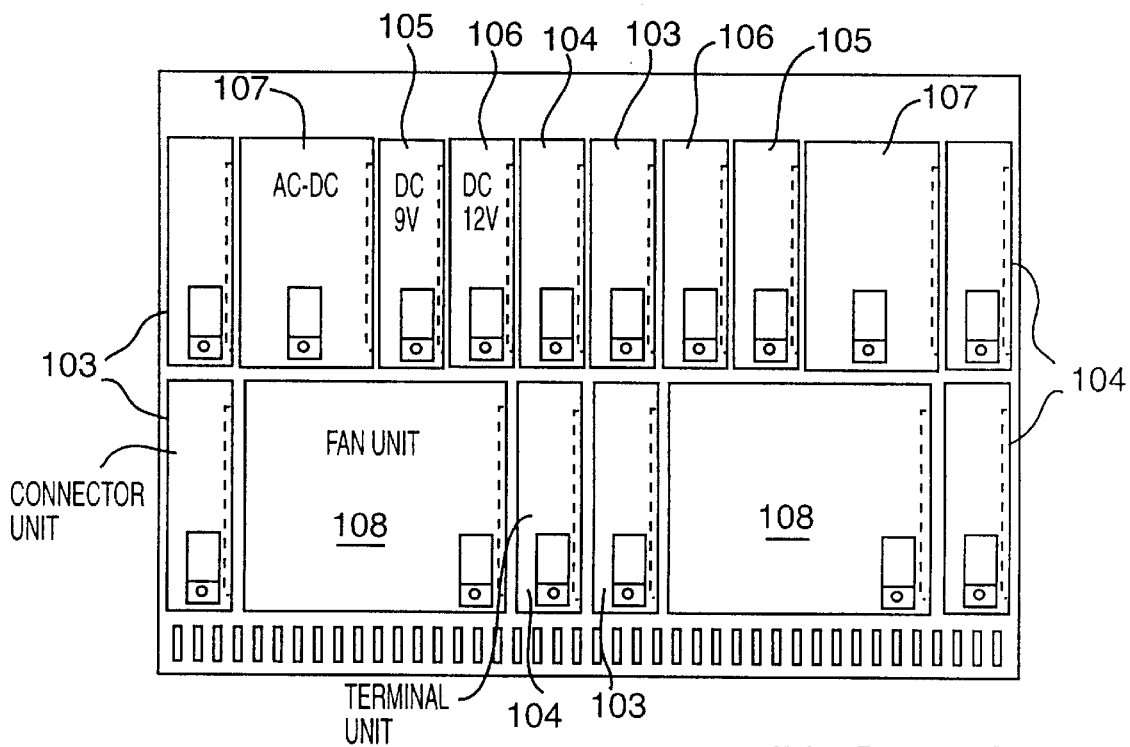

A lever 603 is provided on each pluggable unit at an end portion opposite the end insertable to the mother board 102, as shown in FIG. 2(a). The lever 603, which is pivotably attached to the pluggable unit, is employed to move each unit in the direction of insertion/removal into/from the mother board 102. The lever 603 locks the inserted unit by engaging a front rail 604 of the host computer housing 100, using the principles of a lever and a fulcrum as shown in FIGS. 2(b)–2(d). Removal of the unit begins with the reverse action of unlocking the lever by disengaging the front rail 604. The locking mechanism is conventional; accordingly, no further explanation will be provided.

In this embodiment, disk units 101 (illustratively having 12 hard-disk drives, or HDDs, in each of two rows) are each connected to the connectors 102c provided on the front surface 102a of the mother board 102. With respect to the connectors 102c of the back surface 102b of the mother board 102, the connector unit 103 and the terminal unit 104 are disposed at both ends of each SCSI bus; the 5V power units 105, 12V power units 106 and AC-DC power units 107 are disposed on the upper portion; and the fan units 108 are disposed on the lower portion.

In this way, the mounting space of the housing 100 can be significantly reduced by integrally connecting a group of the disk units 101 and the other peripheral units onto both surfaces of the mother board 102 through a group of connectors. Furthermore, the electrical connection can be simplified by wiring not only control buses but also power lines on the mother board 102 as described later, thereby extremely simplifying maintainance.

Figure 4:
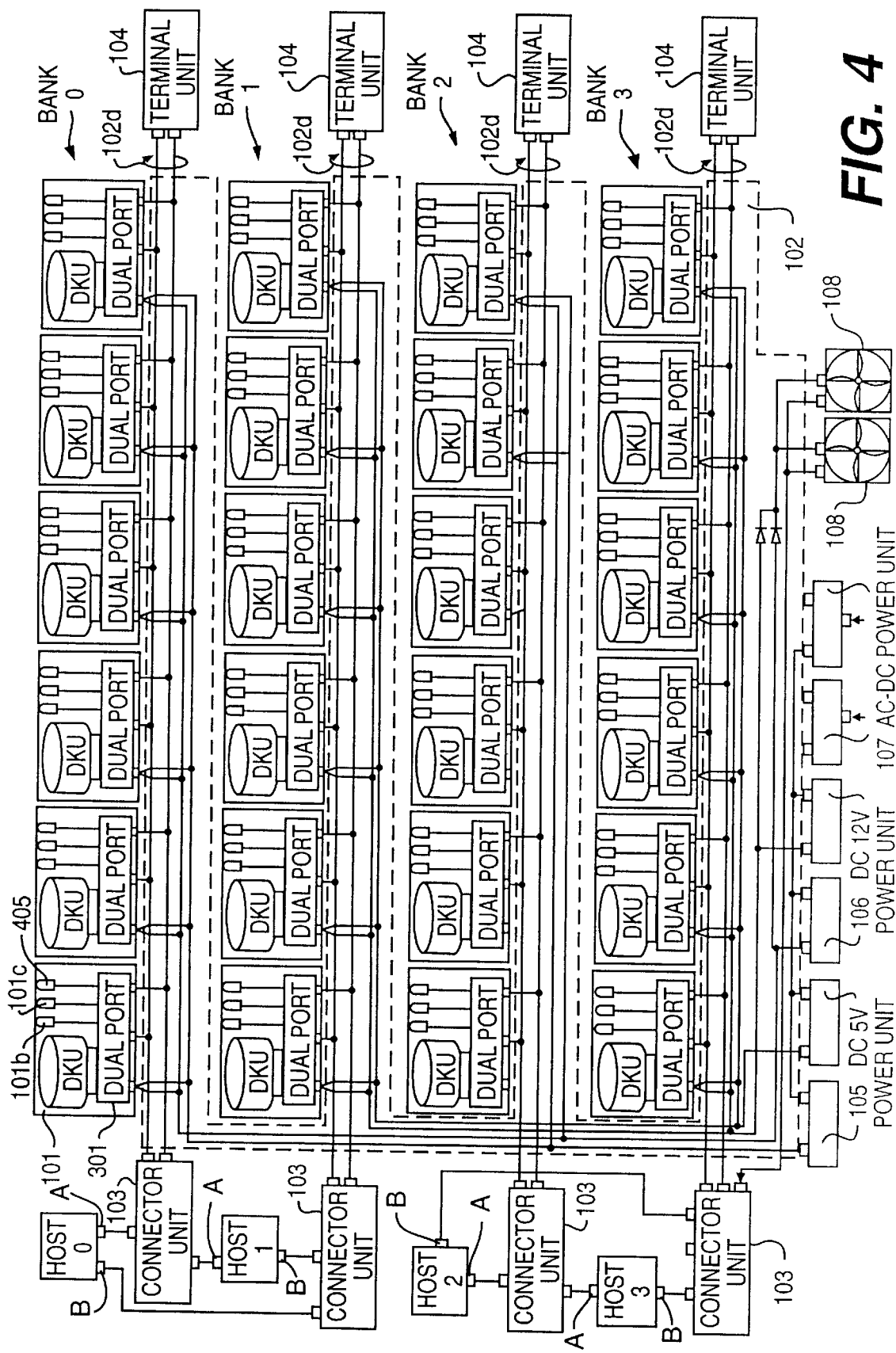
FIG. 4 is a conceptual diagram showing a connection relationship of control buses and power lines in a plural disk unit according to the present invention.

FIG. 4 is a conceptual diagram of a connection relationship of control buses and power lines in this embodiment.

A SCSI bus 102d, which connects the disk units 101 one after another along an interconnection pattern (not shown) on the mother board 102, extends from the connector unit 103 provided on the mother board 102 to the terminal unit 104. In this embodiment, four series of the SCSI buses 102d are each provided for four pairs of connector units 103 and terminal units 104, and 24 constituent HDDs of the disk units 101 are connected to four series of the SCSI buses 102d (six HDDs for each series of the SCSI bus 102d). In other words, in this embodiment, the disk units 101 are disposed in arrays of 6 HDDs for each of four banks (banks 0 to 3). A motor stopping lamp 405 indicating the presence or absence of rotation of a spindle motor (not shown) in the disk unit 101, a power lamp 101b indicating the presence or absence of power, and an access lamp 101c indicating the presence or absence of access are disposed on the outer surface of each disk unit 101.

Next, a power system will be described. The AC-DC power unit 107 produces a DC voltage of, for example, 48 V from commercial AC power supplied from the external power source. The DC voltage of 48 V is imparted to the 5V power unit 105 and the 12V power unit 106 to be respectively converted into DC voltages of 5 V and 12 kV. The DC voltages of 5 V and 12 V are supplied to the disk units 101, fan units 108 and the like. The power lines 102e for connecting these power units to each other and also connecting the power units to the disk units 101 and fan units 108 are contained in an interconnection pattern formed on the mother board 102, and are connected to the units through the connectors 102c of the mother board 102.

In this embodiment, the SCSI bus 102d for each bank on the mother board 102 is composed of dual lines (A and B lines), and each disk unit 101 is provided with a cross-call circuit 301 for connecting the disk unit 101 to the SCSI bus 102d having the A and B lines. Accordingly, each connector unit 103 has two connection ports which are each connected to different host computers. Each of the dual lines of the control bus is controlled by each of the different host computers (host 0 or 1, or 2 or 3). The cross-call circuit 301 (each cross call circuit has dual ports so that each disk unit can access two host computers) freely receives commands supplied from respective hosts through the control bus and transmits them to the disk unit 101 in accordance with a priority level determined by the cross-call circuit 301. A requirement of data transfer from the disk unit 101 on the basis of a certain command is transmitted to the host computer which has produced the command. In this way, a plurality of host computers can share each disk unit 101.

For example, the disk units 101 contained in the bank 0 are connected to the control bus controlled by the host computers 0 and 1, so that they can be shared by the host computers 0 and 1.

Figure 5:
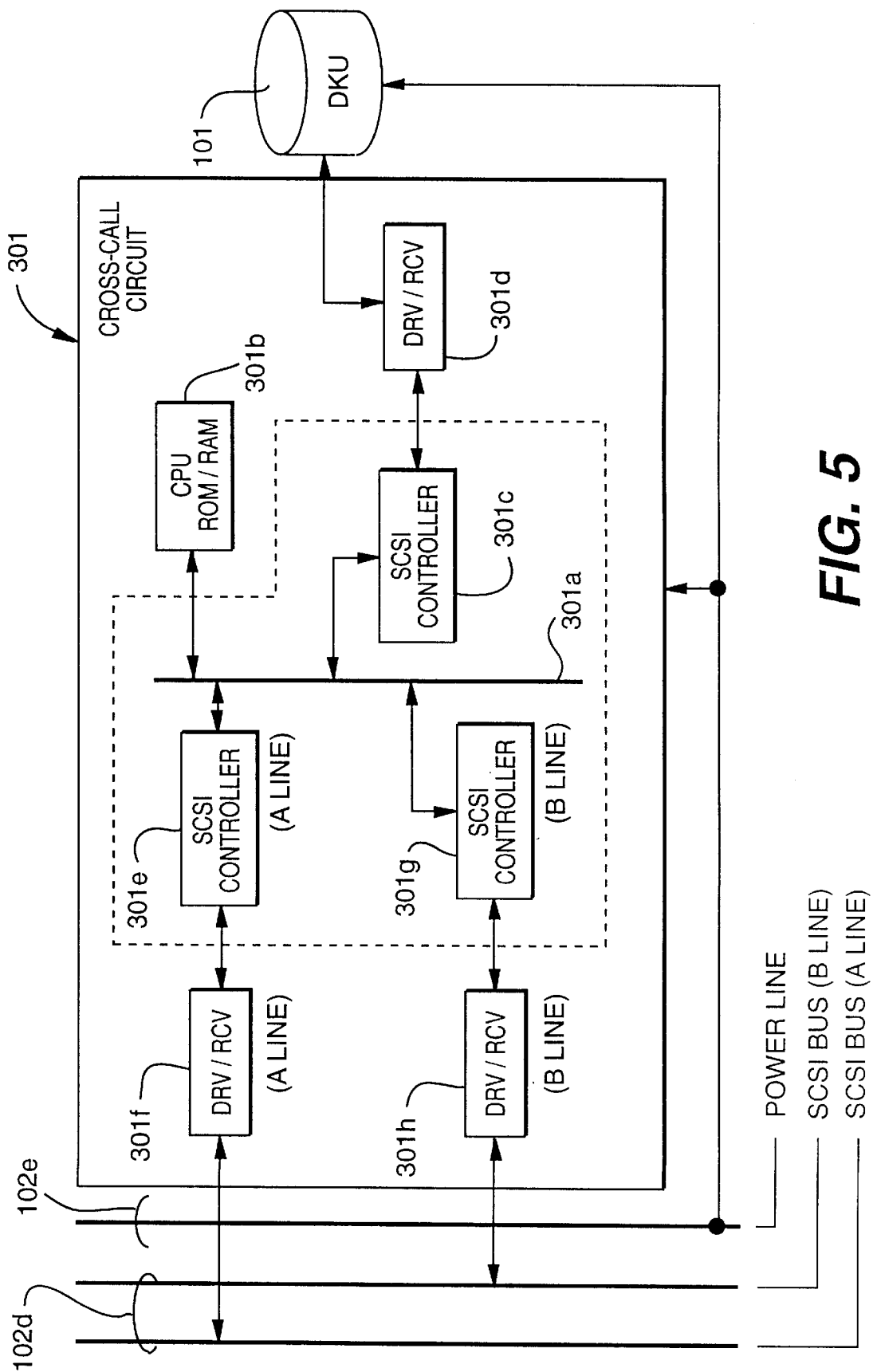
FIG. 5 is a block diagram showing a configuration of a cross-call circuit provided for a disk unit of a plural disk unit apparatus according to the present invention.

FIG. 5 is a block diagram showing a configuration of the cross-call circuit 301 provided in each disk unit 101 in this embodiment. The cross-call circuit 301 includes an internal bus 301a; a cross-call controller 301b including a CPU such as a microprocessor, and ROM, RAM and the like containing control programs; a SCSI controller 301c and a driver/receiver 301d on the disk unit 101 side; and a SCSI controller 301e and a driver/receiver 301f provided for the A line of the control bus, and a SCSI controller 301g and a driver/receiver 301h provided for the B line of the control bus.

The switching between the A and B lines of the control bus is controlled by the cross-call controller 301b. A plurality of the SCSI controllers 301c, 301e and 301g can be contained in one chip using gate array or the like. Each of the driver/receivers 301d, 301f and 301h is used for voltage level conversion between a differential signal of the SCSI bus and a TTL or for filtering of noise in a transmission signal.

Next, one example of a method of exchanging each unit by plugging (active inserting—other disk units are not stopped) in this embodiment will be described. In this embodiment, the disk units 101 and the fan units 108 can be exchanged by plugging.

Figure 6:
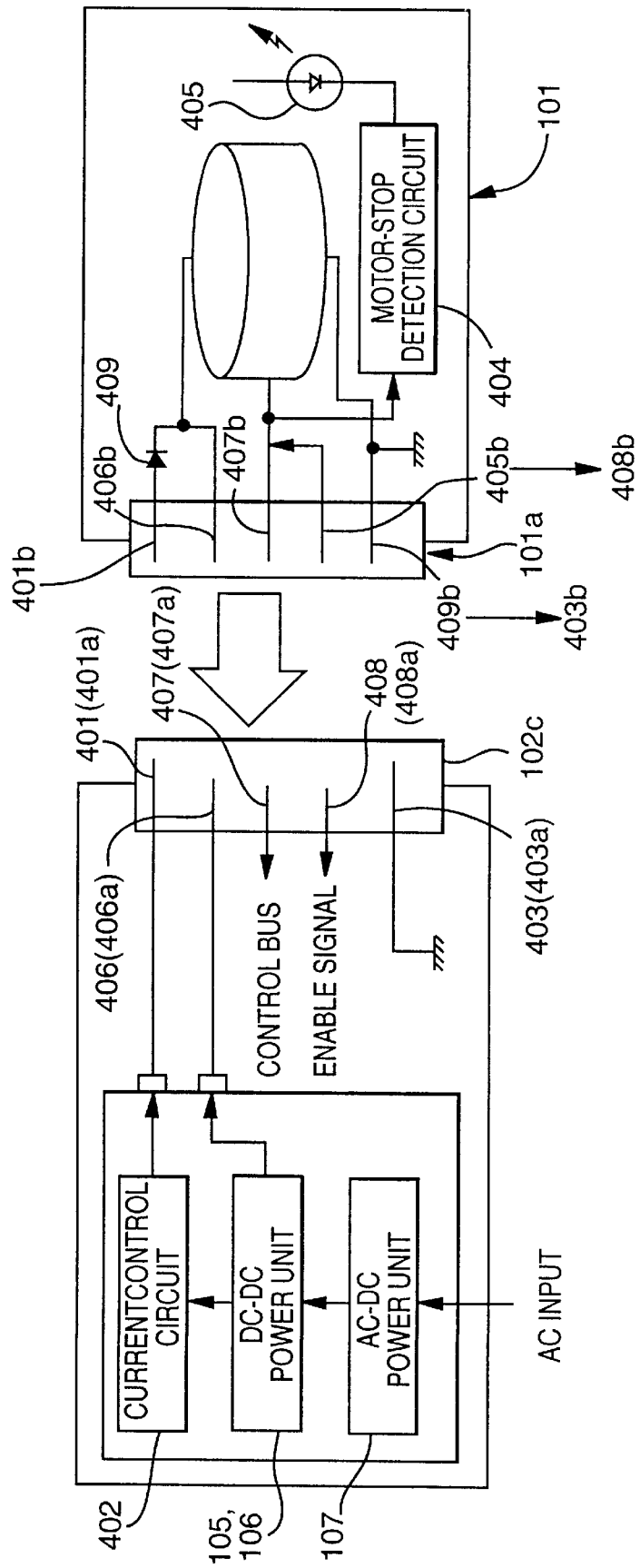
FIG. 6 is a conceptual diagram showing a configuration of a mechanism for inserting or removing a disk unit into or from a mother board in a plural disk unit according to the present invention.

FIG. 6 is a conceptual diagram of a connection portion between the connector 102c provided on the mother board 102 and the disk unit 101 in this embodiment.

In this embodiment, a connection sequence control mechanism in the connector 102c (male type bus connector) on the mother board 102 includes a long pin 401a for a precharge line 401 and a long pin 403a for a ground line 403; an intermediate pin 406a for a power line 406 and an intermediate pin 407a for a control bus signal line 407; and a short pin 408a for an input/output enable signal line 408. The long pins 401a and 403a are longer than the intermediate pins 406a and 407a, which are in turn longer than the short pin 408a.

On the other hand, a female type connector 101a of the disk unit 101 has contact pieces 401b, 406b, 407b, 408b and 403b, having the same length, which are to be connected to the pins 401a, 406a, 407a, 408a and 403a, respectively.

When the connector 101a of the disk unit 101 is inserted in the connector 102c of the mother board 102, the connection of the precharge line 401 and the ground line 403 is first performed, followed by the connection of the power line 406 and the control bus signal line 407. Finally, the connection of the input/output enable signal line 408 is performed.

When the disk unit 101 is mounted on the mother board 102, the connection of the precharge line 401 and the ground line 403 is first performed as described above. At this time, a current control circuit 402 precharges a floating capacitance of the disk unit 101 through the precharge line 401. This is effective to restrict a surge current upon connection of the power line 406, whereby the connection of the disk unit 101 can be performed without a change in the power levels supplied to the other disk units.

When the disk unit 101 is removed, the motor of the disk unit 101 is stopped. This minimizes current consumption and ensures that the power level is not affected. A motor-stop detection circuit 404 detects a command for stopping the motor and displays the detection result via a motor-stop lamp 405. An operator checks for the stoppage of the disk unit motor by checking the motor-stop lamp 405 before removing the disk unit 101 from the mother board 102.

When the disk unit 101 is inserted in the connector 102c of the mother board 102, the control bus signal line 407 (intermediate pin 407a) is in a disable state until the input/output enable signal line 408 (short pin 408a) is connected after the control bus signal line 407 is connected. As a result, it is possible to greatly reduce any effects adverse to the control bus signal upon connection.

When the disk unit 101 is removed, the connection of the control bus signal line 407 (intermediate pin 407a) is released after the input/output enable state of the control bus signal is released. As a result, the disk unit 101 can be plugged and unplugged while minimizing effects adverse to the other, operating, disk units 101. Moreover, no special mechanism for precharging the floating capacitance of the disk unit 101 is needed on the disk unit 101 side, thereby enabling the insertion/removal of the disk unit with a very simple configuration.

Figure 8:
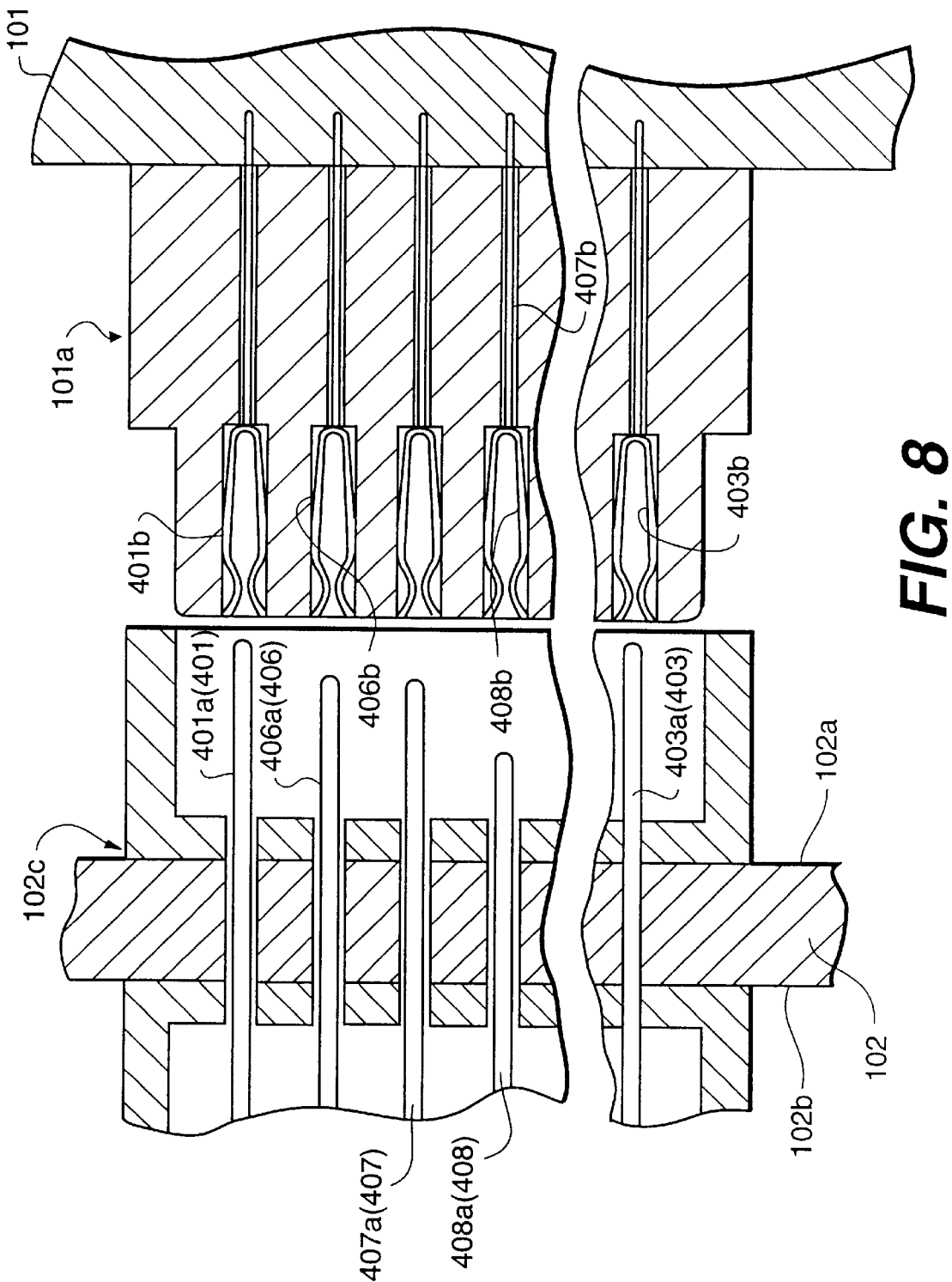
FIG. 8 is a sectional view showing the structure of a mechanism for inserting or removing a disk unit into or from a mother board in a plural disk unit according to the present invention.

FIG. 8 is a sectional view showing a concrete structure of the connector 101a of the disk unit 101 removably inserted as described above, and a concrete structure of the connector 102c of the mother board 102. Each pin of the connector 102c is electrically connected to an interconnection pattern (not shown) provided on the surface or in the interior of the mother board 102. As described above, the long pins 401a and 403a are longer than the intermediate pins 406a and 407a, which are longer than the short pin 408a.

On the other hand, each contact piece of the connector 101a has the same length in the connecting direction. With this length relationship, when the disk unit 101 is inserted or removed into or from the mother board 102, the connection order of each pin can be suitably controlled.

Figure 7:
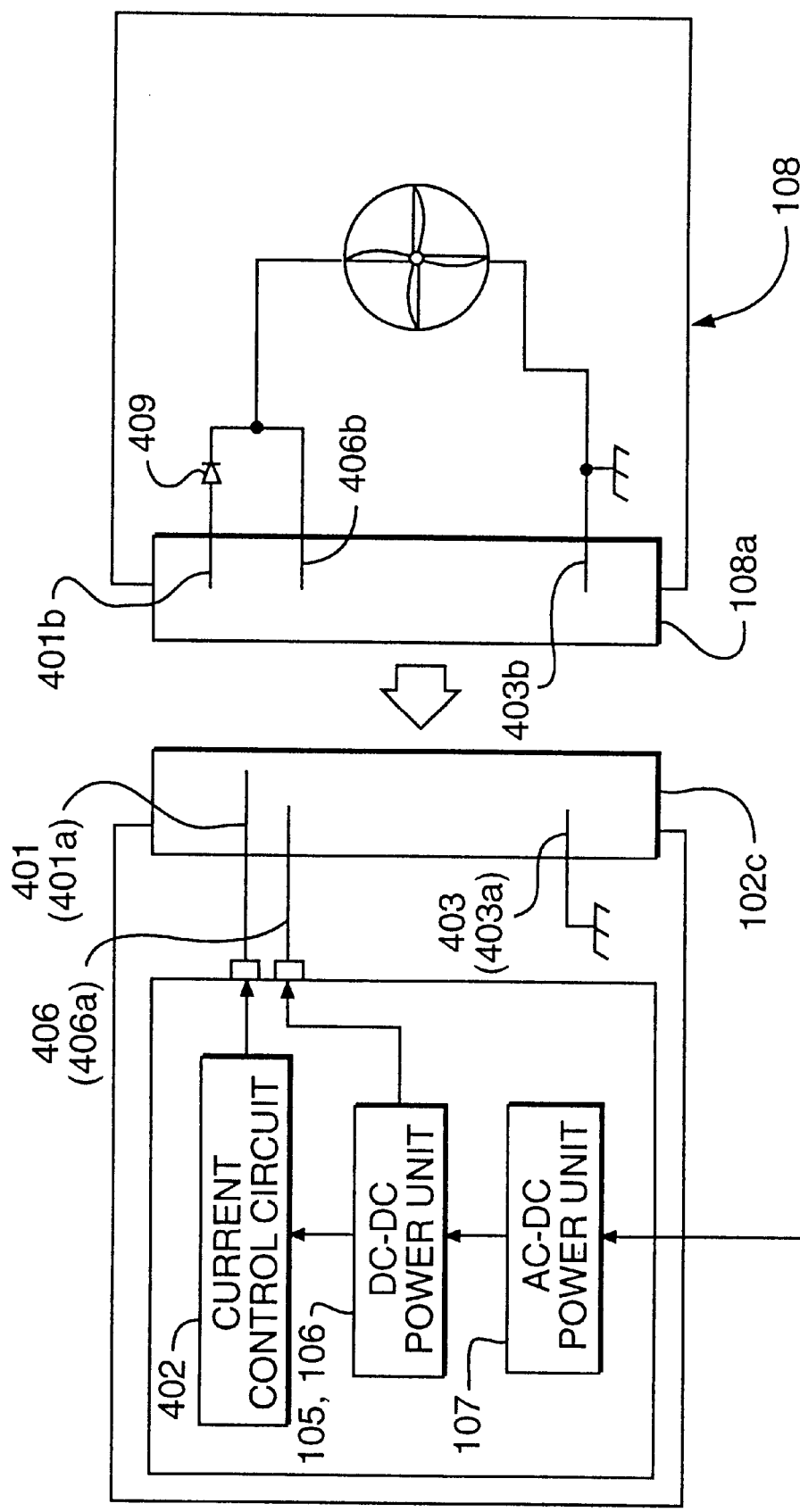
FIG. 7 is a conceptual diagram showing a mechanism for inserting or removing a fan unit into or from a mother board in a plural disk unit according to the present invention.

The insertion or removal of the fan unit 108 by plugging or unplugging can be performed in the same manner as that of the disk unit 101. FIG. 7 is a conceptual diagram of a mechanism of inserting or removing the fan unit 108 into or from the mother board 102. The connector 102c of the mother board 102, into/from which the fan unit 108 is to be inserted/removed, has a precharge line 401 (long pin 401a), a ground line 403 (long pin 403a), and a power line 406

(intermediate pin 406a). The connector 108a of the corresponding fan unit 108 has contact pieces 401b, 403b, and 406b, having the same length, which are connected to the pins 401a, 403a, and 406a, respectively. The precharge line on the fan unit 108 side is provided with a counterflow preventive diode 409.

When the fan unit 108 is inserted in the connector 102c of the mother board 102, the connection of the precharge line 401 (long pin 401a) and the ground line 403 (long pin 403a) is first performed to precharge the floating capacitance of the fan unit 108. This is effective to prevent a power voltage variation in the other disk units during operation. In addition, since the power consumption of the fan motor is smaller than that of the disk unit 101, a mechanism for checking for the stoppage of the motor is not particularly provided; however, it may be provided as needed, for example in the case of a large-sized fan unit 108.

Next, the adjustment of a load interval for high-density mounting of the disk units 101 will be described. As mentioned above, in the case where a plurality of the disk units 101 are closely disposed on the front surface 102a of the mother board 102, the load interval between the adjacent bus connectors 102c on the front surface 102a is shorter than the tap-off length, which is the sum of the length of each pin of the connector 102c, the length of each contact piece in the connector 101a, the wiring length in the cross-call circuit 301, and the like. Accordingly, if the control bus line is simply wired on the mother board 102, noise, such as signal reflection, increases. To cope with such an inconvenience, the following measure is adopted.

Figure 9A:
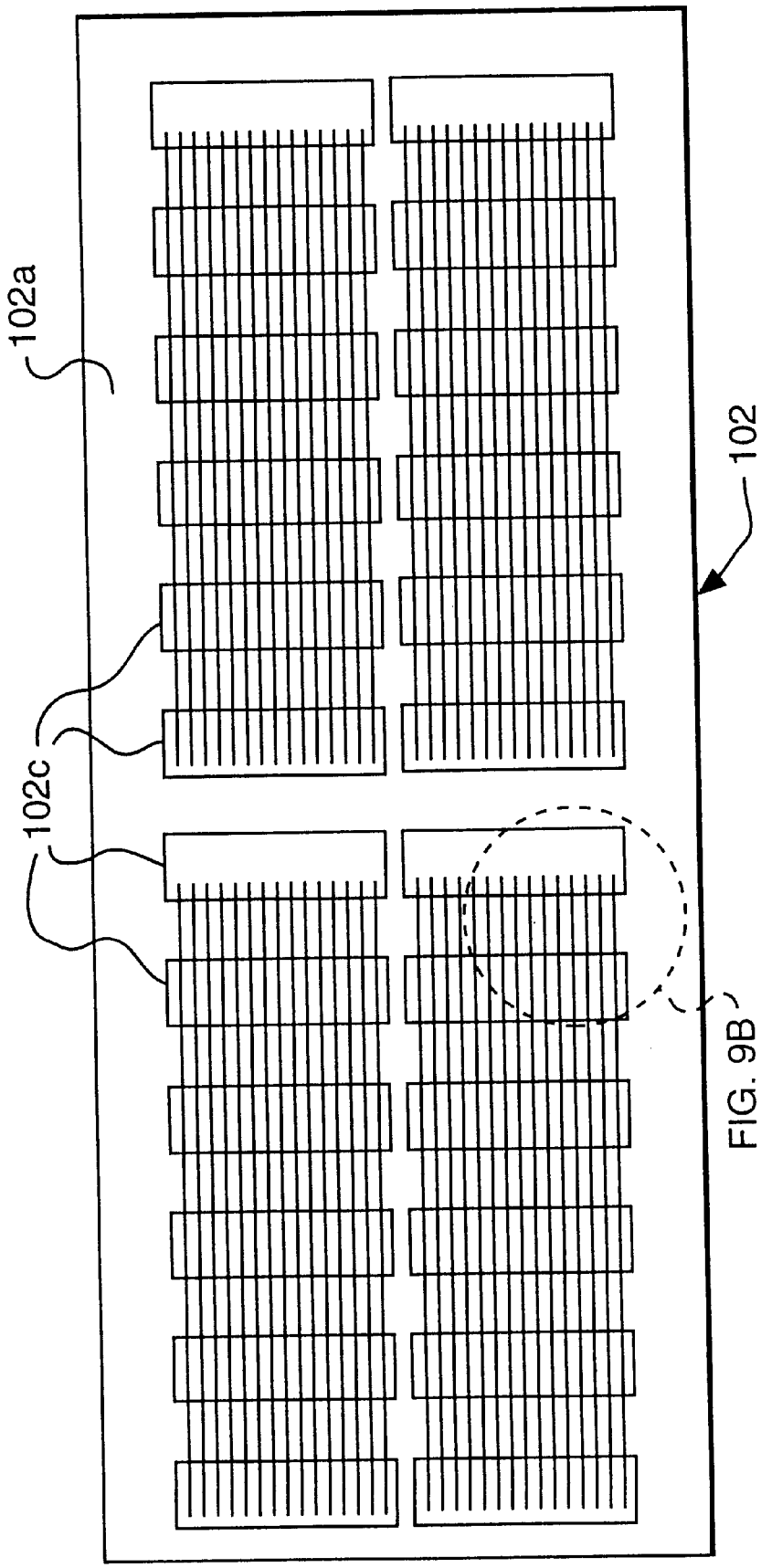
FIGS. 9(a) and 9(b) are together a conceptual diagram showing an interconnection pattern containing control buses, which is formed on a mother board of a plural disk unit according to the present invention.

FIG. 9(a) is a conceptual diagram showing an interconnection pattern containing control buses and the like, which is formed on the mother board 102 of the plural disk unit according to the present embodiment.

Figure 9B:
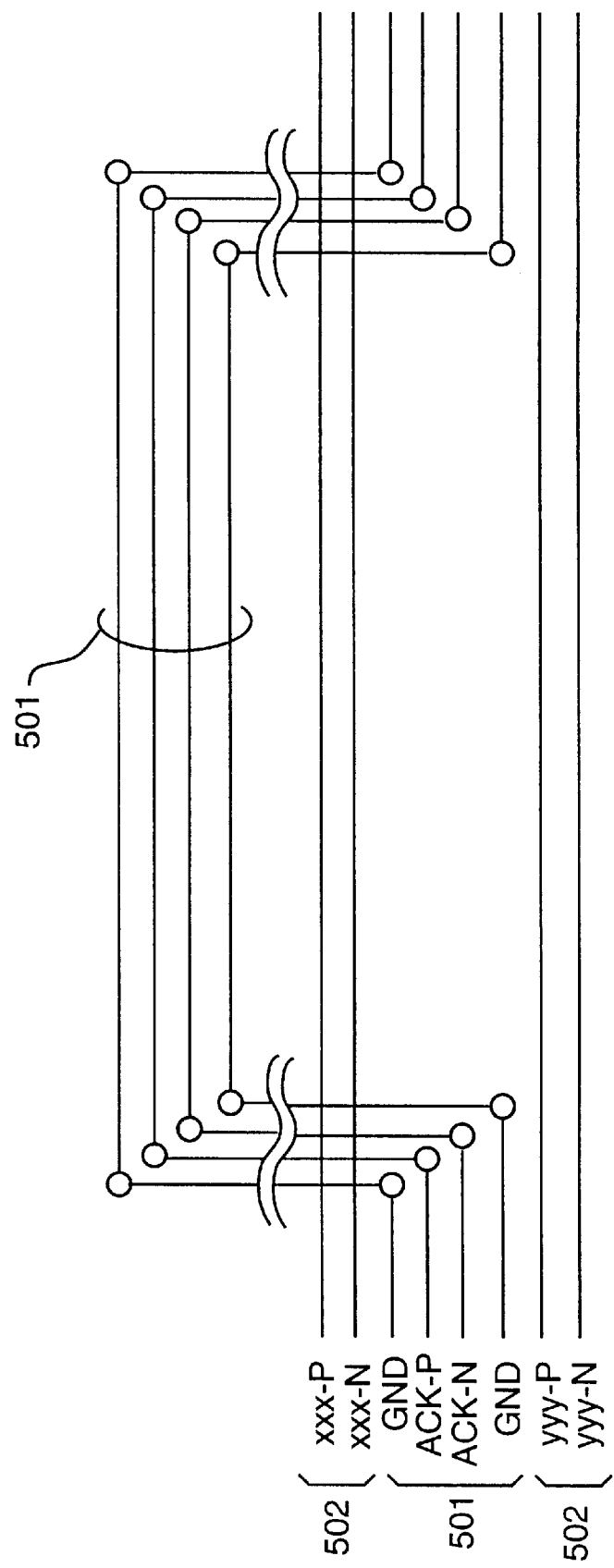

In the case where the SCSI bus is used as the control bus, reference numeral 501 indicates an ACK signal line, and reference numeral 502 is the other signal line in FIG. 9(b). For a differential-type WIDE-SCSI bus, the ACK signal line 501 is composed of ACK-P and ACK-N lines. Ground lines GND disposed on both the sides of these ACK-P and ACK-N lines are guard lines for protecting transmission of noise.

When the load interval obstructs high-density mounting, problems are particularly caused for special control bus signals having strict timing requirements. Consequently, there is no problem with high-speed operation if a sufficient measure is performed for these special signals. SCSI signals that are switched to high speeds include a REQ signal and an ACK signal. In particular, the ACK signal is affected more by a reflection wave than the REQ signal. The ACK signal, which is output from a host adapter at the terminal of a transmission path and is received by the disk unit 101 at the intermediate portion of the transmission path, is greatly affected by a reflection wave because the signal reception position is remote from the terminal circuit (terminal unit 104).

In this embodiment, the bus connector (connector 102c) is first disposed, and the relevant control signal line (ACK signal line 501) is wired by patterning in such a manner as to make a detour from the other signal line 502 along a crank-shaped path, to maintain a load interval sufficiently longer than the tap-off length. At this time, the interconnection pattern for these control signals is not required to be along the shortest straight line, but is allowed to be formed in a meander. However, a pair of signal lines, such as positive/negative electrodes in the case of an equilibrium transmission path, must be wired to be adjacent to each other. A guard line for preventing the transmission of external noise to the signal lines may be provided as needed. The remaining bus signal lines are normally wired to keep the shortest distance. This can solve the above-described problem in terms of load interval upon high-density mounting of the disk units 101 while suppressing wiring density.

The correction of the differential wiring delay caused by selective detouring of the ACK signal line 501 is small, so as not to exert any adverse effect on operation. Consequently, the operation of the control bus can be ensured.

Figure 10:
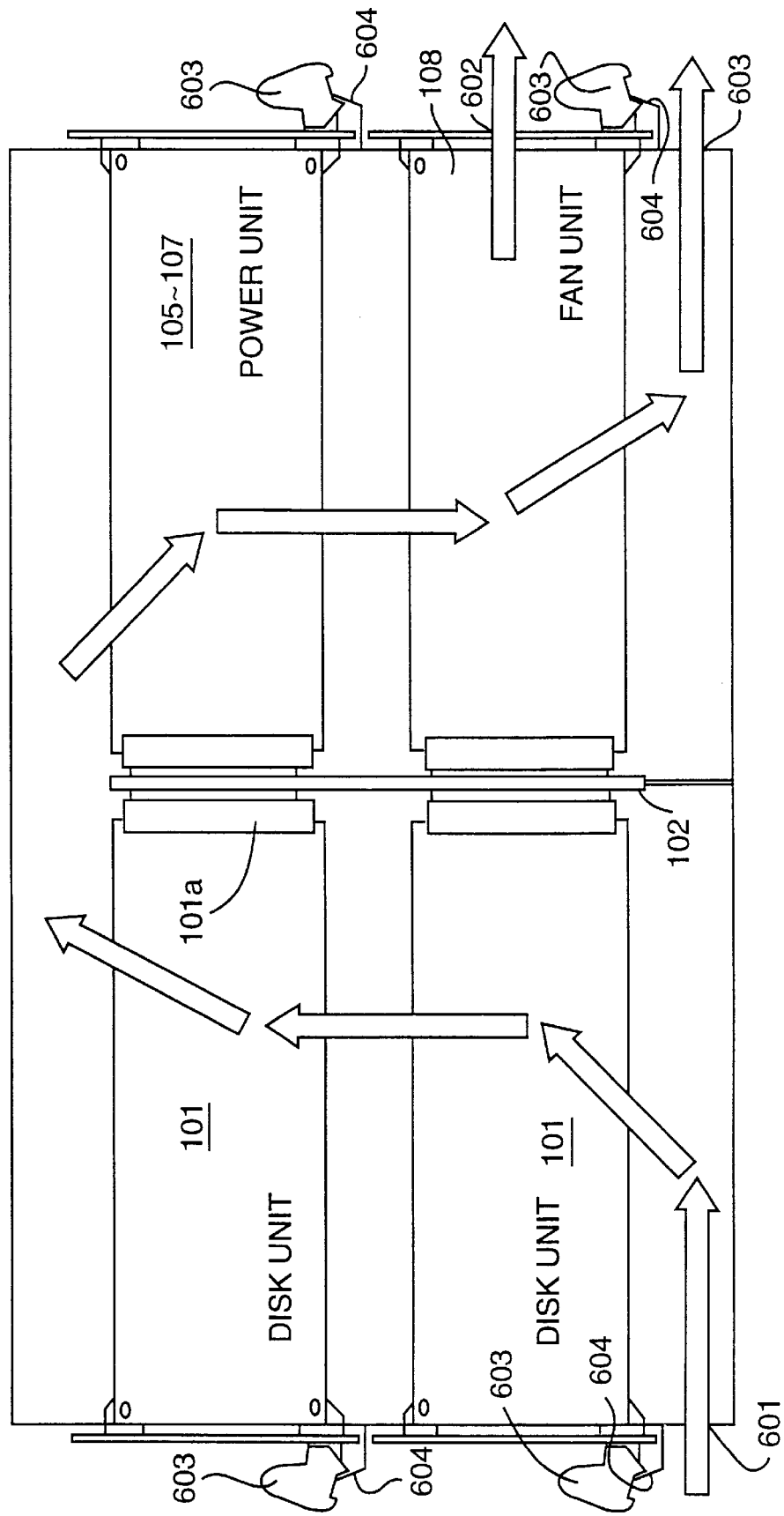
FIG. 10 is a side view showing a cooling air flow path in a plural disk unit according to the present invention.

Next, a method of cooling the plural disk unit in this embodiment will be described. FIG. 10 is a side view showing a flow path of cooling air in the plural disk unit in this embodiment.

As shown in FIG. 10, the lower portion of the side surface of the housing 100, faced by the front surface 102a side of the mother board 102 on which the disk units 101 are disposed, has a cooling air suction port 601; and the lower portion of the side surface of the housing 100 faced by the back surface 102b side of the mother board 102 on which the power units and the fan units 108 are provided, has a cooling air discharge port 602.

With this configuration, when the fan units 108 are operated, low-temperature cooling air sucked from the suction port 601 formed in the lower portion of the side surface of the housing flows along the path shown by the arrow. Namely, the cooling air first flows from bottom to top between the disk units 101 at which the heat generation is concentrated, passing between the upper wall surface of the housing 100 and the mother board 102, and flows from top to bottom along the back surface 102b through the power units and the fan unit 108. The cooling air is finally discharged outside the housing 100 through the discharge port 602 formed in the lower portion of the side surface of the housing 100. This allows the lower-temperature cooling air to be first brought into contact with the densely-mounted disk units 101, thereby increasing the cooling effect on the disk units 101.

Preferably, air flows through open spaces above and below the disk units, and the mother board is attached to the housing at the bottom only.

Figure 11B:
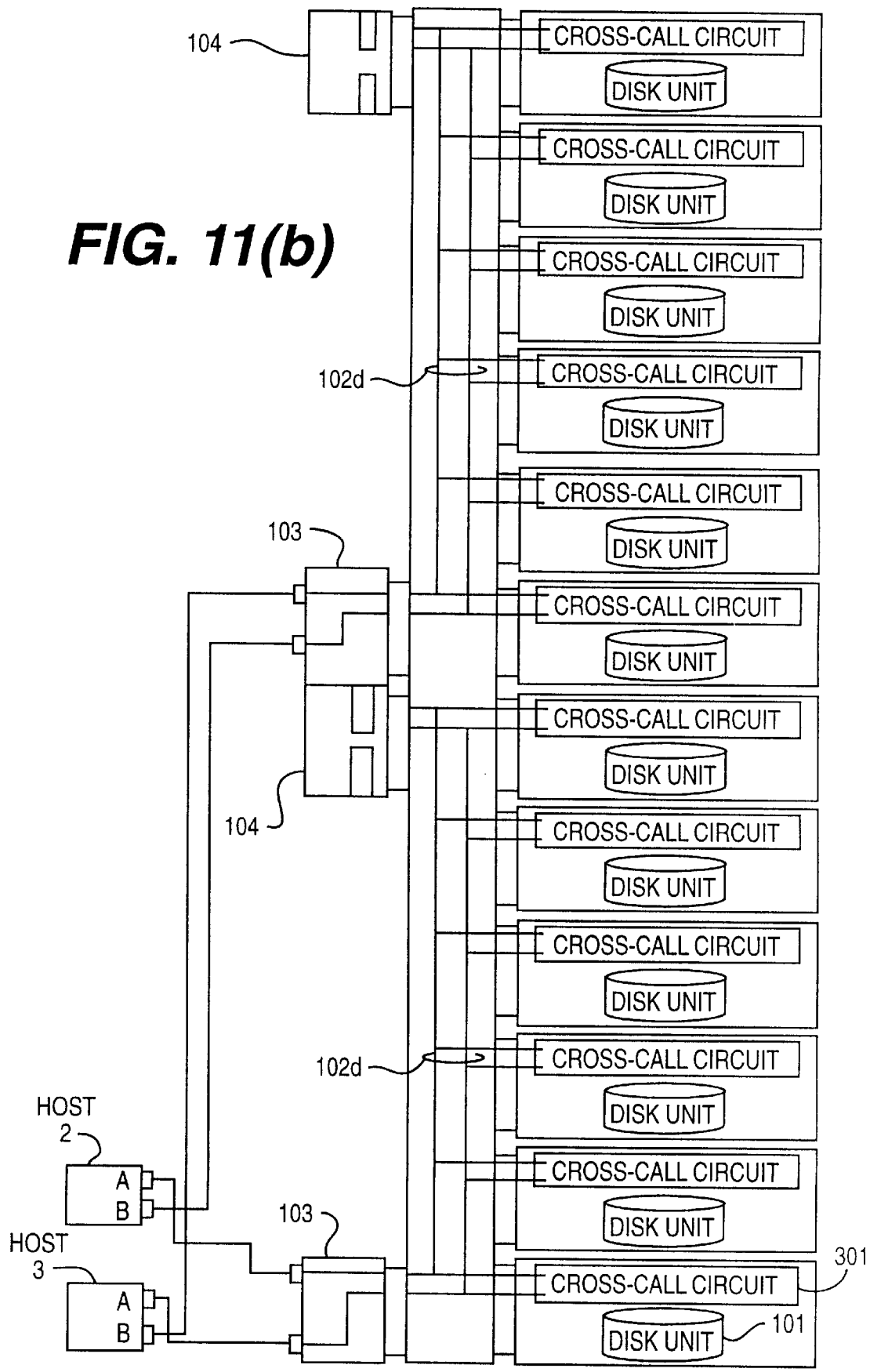
Figure 12:
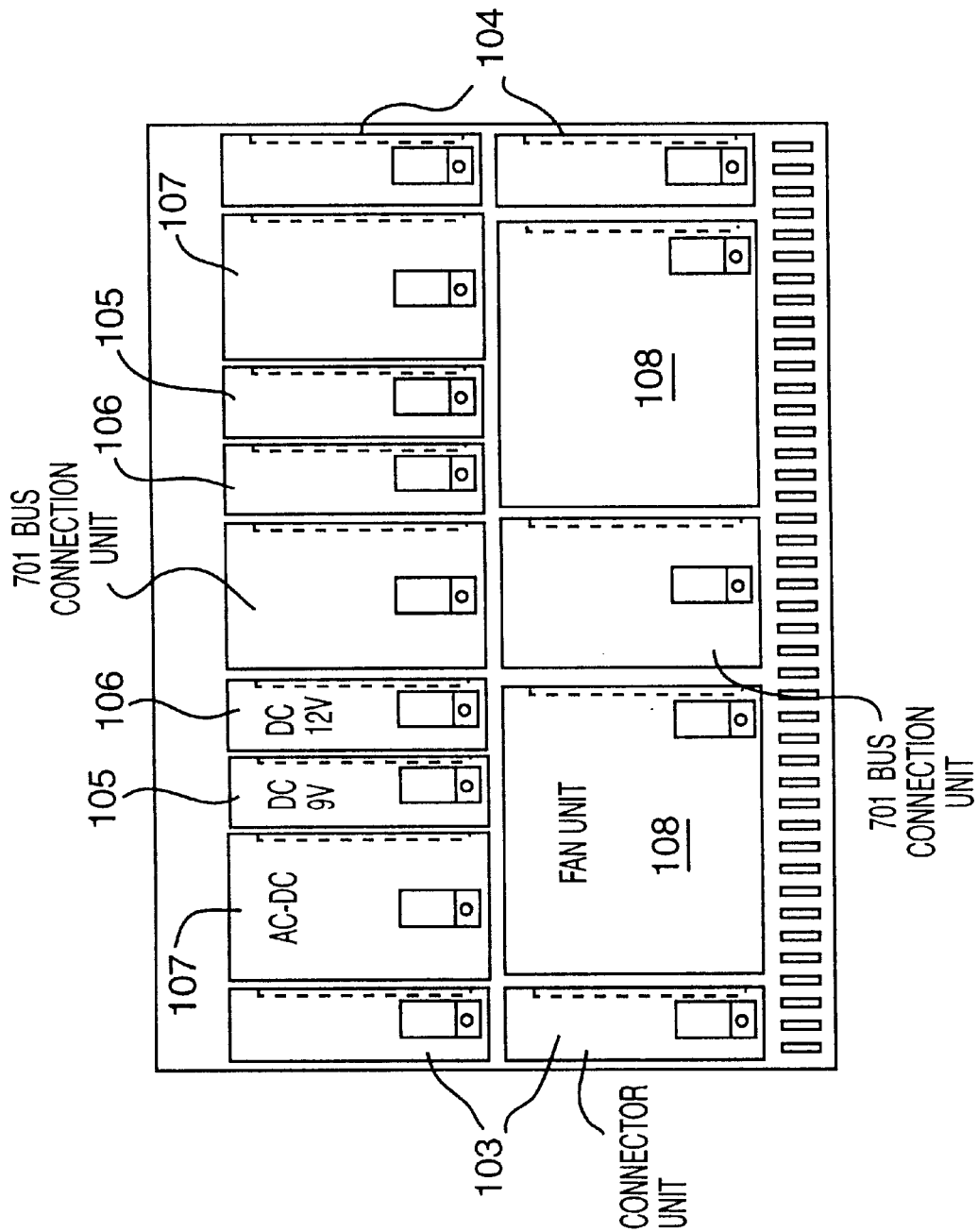
FIG. 12 is a rear view of a mother board having a bus connection unit in a plural disk unit according to the present invention.

The change in the number of channels (control groups) for controlling the plurality of disk units 101 will be described below. In the above description, the plurality of disk units 101 are controlled in a state in which they are divided into four banks, or channels (control groups); however, in this embodiment, the number of channels of disk units 101 can be easily changed. For example, as shown in FIG. 11(b), the channels for each SCSI bus can be easily changed between many channels and two channels by replacing the terminal unit 104 and the connector unit 103 of different adjacent channels with a bus connection unit 701. In addition, FIG. 12 is a rear view of the mother board 102 in the case where the bus connection unit 701 is mounted.

Figure 11A:
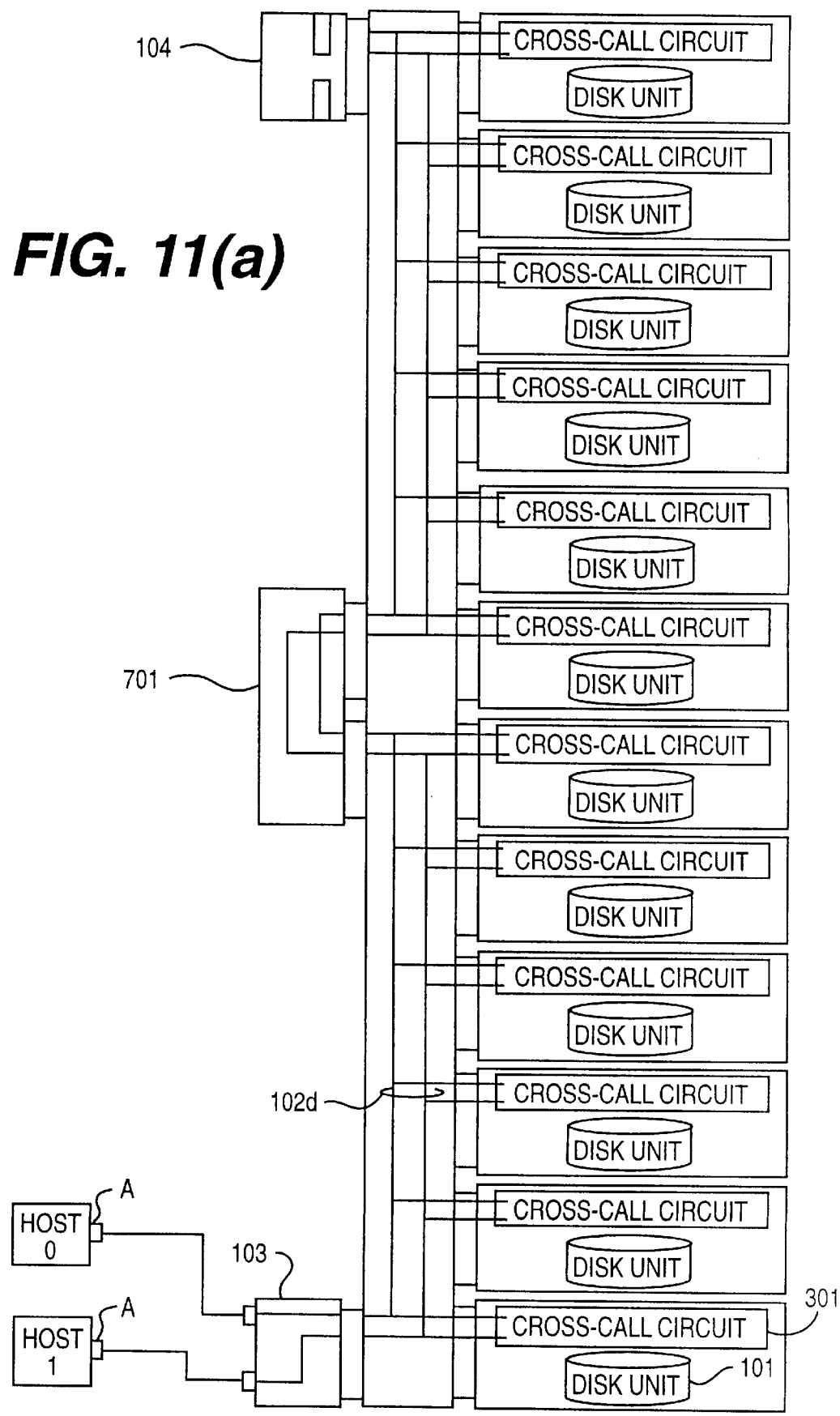
FIGS. 11(a) and 11(b) are conceptual diagrams showing a change in the number of channels for controlling control buses in a plural disk unit according to the present invention.

For example, as shown in FIG. 11(a), the control buses are usually connected to each other by means of the bus connection unit 701. On the other hand, in the case where performance of each control bus is less than that required for the host side, as shown in FIG. 11(b), the bus connection unit 701 is replaced with the terminal unit 104 and the connector unit 103. Thus, the control buses in two channels can be distributed into a plurality of channels to be controlled. Accordingly, the performance of an apparent data transfer speed of the plural disk unit, as seen from each host side, can be improved.

While preferred embodiments of the present invention have been described using specific terms, such description is for illustrative purposes only, and it is to be understood that changes and variations may be made without departing from the scope or spirit of the present invention.

For example, the SCSI bus is used as the control bus in the above-described embodiment; however, the present invention is extensively applicable for general type control buses.

We claim:

1. A plural disk unit apparatus, comprising:
   a mother board formed with an interconnection pattern including at least control buses and power lines;
   a plurality of connectors disposed on said mother board, and connected to said interconnection pattern; and
   a plurality of disk units directly connected to said mother board in such a manner as to be removably inserted by plugging into said plurality of connectors disposed on said mother board;
   wherein a wiring path of said interconnection pattern between adjacent ones of said plurality of connectors, for specified ones of a plurality of signals contained in said control buses, is made selectively longer than any other wiring paths of said interconnection pattern between said adjacent ones of said plurality of connectors.

2. A plural disk unit apparatus according to claim 1, wherein said plurality of disk units are divided into groups that are each served by a different one of said control buses divided into multiple lines, and wherein a cross-call circuit for processing access requirements from said multiple lines of said different ones of said control buses is provided on each of said plurality of disk units, whereby all of said plurality of disk units are shared by a plurality of host computers.

3. A plural disk unit apparatus according to claim 1, wherein a connection sequence control means for performing connection of an input/output enable signal line of a plurality of signal lines contained in one of said control buses after connection of the other signal lines contained in said one of said control buses upon insertion of each of said plurality of disk units into a respective one of said plurality of connectors is provided on said respective one of said plurality of connectors, so that said one of said control buses is connected in an input/output disable state and is then made in an input/output enable state upon insertion of each said disk unit into said respective one of said plurality of connector, and the connection of each said control bus is cut-off after the input/output enable state is released upon removal of each said disk unit from said respective one of said connectors, thereby enabling exchange of an arbitrary one of said plurality of disk units by plugging, irrespective of an operational state of the control bus serving said arbitrary disk unit.

4. A plural disk unit apparatus according to claim 1, wherein a pre-charge line for previously charging a floating capacitance of each of said plurality of disk units upon insertion thereof into one of said connectors is provided on said mother board;
   wherein a current control circuit for controlling a current of said pre-charge line is provided on said apparatus; and
   wherein a connection sequence control means for performing connection of said pre-charge line before connection of a power line upon insertion of each of said plurality of disk units into a respective one of said plurality of connectors is provided on said respective one of said plurality of connectors formed on said mother board, thereby suppressing a variation in power voltage upon insertion of each of said plurality of disk units into said respective one of said plurality of connectors and enabling insertion of all of said plurality of disk units into said respective ones of said plurality of connectors by plugging without provision of said current control circuit on the side of each of said plurality of disk units.

5. A plural disk unit apparatus according to claim 1, wherein each of said plurality of disk units is provided with a motor and a motor stopping display circuit for detecting and displaying a motor stopping command therefor, thereby enabling disk unit removal after checking for stopping of the motor.

6. A plural disk unit apparatus according to claim 1, further comprising:
   a connector unit directly connected to said mother board through one of said plurality of connectors formed on said mother board and having a connector for said control buses; and
   a terminal unit directly connected to said mother board through one of said plurality of connectors formed on said mother board and having a terminal circuit of said control buses.

7. A plural disk unit apparatus according to claim 1, further comprising a fan unit directly connected to said mother board through one of said plurality of connectors and having a fan for ventilating the interior of said apparatus.

8. A plural disk unit apparatus according to claim 1, further comprising a power unit for supplying operational power to said plurality of disk units, directly connected to said mother board through one of said plurality of connectors.

9. A plural disk unit apparatus, comprising:
   a mother board formed with an interconnection pattern including at least control buses and power lines;
   a first plurality of connectors disposed on a first main surface of said mother board, and connected to said interconnection pattern;
   a second plurality of connectors disposed on a second main surface of said mother board, and connected to said interconnection pattern;
   a plurality of disk units directly connected to said mother board in such a manner as to be removably inserted by plugging into said first plurality of connectors disposed on said mother board;
   a connector unit directly connected to said mother board through one of said second plurality of connectors formed on said mother board and having a connector for said control buses;
   a terminal unit directly connected to said mother board through one of said second plurality of connectors formed on said mother board and having a terminal circuit of said control buses;
   a fan unit directly connected to said mother board through one of said second plurality of connectors and having a fan for ventilating the interior of said apparatus; and
   a power unit directly connected to said mother board through one of said second plurality of connectors formed on said mother board, for supplying operational power to said plurality of disk units, said connector unit, said terminal unit and said fan unit;
   wherein said first and second main surfaces are front and back surfaces of said mother board.

10. A plural disk unit apparatus according to claim 9, wherein a pre-charge line for previously charging a floating capacitance of each of said plurality of disk units upon insertion thereof into one of said first plurality of connectors is provided on said mother board;

wherein a current control circuit for controlling a current of said pre-charge line is provided on an arbitrary one of said units other than said plurality of disk units; and wherein a connection sequence control means for performing connection of said pre-charge line before connection of a power line upon insertion of each of said plurality of disk units into a respective one of said first plurality of connectors is provided on said respective one of said first plurality of connectors formed on said mother board, thereby suppressing a variation in power voltage upon insertion of each of said plurality of disk units into said respective one of said first plurality of connectors and enabling insertion of all of said plurality of disk units into said respective ones of said first plurality of connectors by plugging without provision of said current control circuit on the side of each of said plurality of disk units.

11. A plural disk unit apparatus according to claim 9, further comprising a plurality of fan units directly connected to said mother board through one of said second plurality of connectors and having a fan for ventilating the interior of said apparatus;

wherein a pre-charge line for previously charging a floating capacitance of each of said fan units upon insertion thereof into one of said second plurality of connectors is provided on said mother board; a current control circuit for controlling a current of said pre-charge line is provided on an arbitrary one of said units other than said plurality of disk units and said fan units or on said mother board; and wherein a connection sequence control mechanism for performing connection of said pre-charge line before connection of a power line upon insertion of each of said plurality of fan units into a respective one of said second plurality of connectors is provided on said respective one of said second plurality of connectors formed on said mother board, thereby suppressing a variation in power voltage upon insertion of each of said plurality of fan units and enabling insertion of all of said plurality of fan units by plugging without provision of said current control circuit on the side of each of said plurality of fan units.

12. A plural disk unit apparatus according to claim 9, wherein a housing of said apparatus has a suction port opened in a first surface thereof faced by said first surface of said mother board, and a discharge portion opened in a second surface thereof faced by said second surface of said mother board, wherein said fan unit is operated for allowing a cooling air flow to be introduced from said suction port in said housing to contact said plurality of disk units and thereby cool said plurality of disk units, to pass through said power unit, and to be forcibly discharged outside said housing through said discharge port.

13. A plural disk unit apparatus according to claim 1, further comprising:

a plurality of connector units directly connected to said mother board through said plurality of connectors formed on said mother board, each of said plurality of connector units having a connector for said control buses; and a plurality of terminal units directly connected to said mother board through said plurality of connectors formed on said mother board, each of said plurality of terminal units having a terminal circuit of said control buses;

wherein each pair of one of said terminal units and one of said connector units are disposed adjacent to each other on said second main surface, and are replaceable with a bus connection unit for connecting a plurality of control buses to each other, thereby making variable the number of channels for controlling said control buses.

14. A mother board for plural disk unit apparatus, comprising:

an interconnection pattern including at least control buses and power lines; and a plurality of connectors disposed on said mother board, and connected to said interconnection pattern;

wherein said plurality of connectors are to be connected to a plurality of disk units; and wherein a wiring path of said interconnection pattern between adjacent ones of said plurality of connectors, for specified ones of a plurality of signals contained in said control buses, is made selectively longer than any other wiring paths of said interconnection pattern between said adjacent ones of said plurality of connectors.

15. A mother board for plural disk unit apparatus according to claim 14, wherein a connection sequence control means for performing connection of an input/output enable signal line contained in one of said control buses after connection of the other signal lines of said one of said control buses upon insertion of each of said plurality of disk units into a respective one of said plurality of connectors is provided on said respective one of said plurality of connectors, so that said one of said control buses is connected in an input/output disable state and is then made in an input/output enable state upon insertion of each said disk unit into said respective one of said plurality of connectors, and the connection of said one of said plurality of control buses is cut-off after the input/output enable state is released upon removal of each said disk unit from said respective one of said plurality of connectors, thereby enabling exchange of an arbitrary one of said plurality of disk units by plugging, irrespective of an operational state of said one of said control buses.

16. A plural disk unit apparatus according to claim 1, wherein a load interval between said adjacent ones of said plurality of connectors for said specified ones of a plurality of signals contained in said control buses is greater than a tap-off length of each connected one of said plurality of disk units and said mother board.

17. A mother board for plural disk unit apparatus according to claim 14, wherein a load interval between said adjacent ones of said plurality of connectors for said specified ones of a plurality of signals contained in said control buses is greater than a tap-off length of each connected one of said plurality of disk units and said mother board.

18. A plural disk unit according to claim 1, wherein at least one of said specified ones of a plurality of signals contained in said control buses is an acknowledge ACK signal.

19. A mother board for plural disk unit apparatus according to claim 14, wherein at least one of said specified ones of a plurality of signals contained in said control buses is an acknowledge ACK signal.

20. A plural disk unit apparatus, comprising:

a mother board formed with an interconnection pattern including at least control buses and power lines;

a plurality of connectors disposed on said mother board, and connected to said interconnection pattern; and a plurality of disk units directly connected to said mother board in such a manner as to be removably inserted by plugging into said plurality of connectors disposed on said mother board;

wherein a load interval between adjacent ones of said plurality of connectors for specified ones of a plurality of signals contained in said control buses is greater than a tap-off length of each connected one of said plurality of disk units and said mother board.

21. A plural disk unit apparatus according to claim 20, wherein said plurality of disk units are divided into groups that are each served by a different one of said control buses divided into multiple lines, and wherein a cross-call circuit for processing access requirements from said multiple lines of said different ones of said control buses is provided on each of said plurality of disk units, whereby all of said plurality of disk units are shared by a plurality of host computers.

22. A plural disk unit apparatus according to claim 20, wherein a connection sequence control means for performing connection of an input/output enable signal line of a plurality of signal lines contained in one of said control buses after connection of the other signal lines contained in said one of said control buses upon insertion of each of said plurality of disk units into a respective one of said plurality of connectors is provided on said respective one of said plurality of connectors, so that said one of said control buses is connected in an input/output disable state and is then made in an input/output enable state upon insertion of each said disk unit into said respective one of said plurality of connector, and the connection of each said control bus is cut-off after the input/output enable state is released upon removal of each said disk unit from said respective one of said connectors, thereby enabling exchange of an arbitrary one of said plurality of disk units by plugging, irrespective of an operational state of the control bus serving said arbitrary disk unit.

23. A plural disk unit apparatus according to claim 20, wherein a pre-charge line for previously charging a floating capacitance of each of said plurality of disk units upon insertion thereof into one of said connectors is provided on said mother board;

wherein a current control circuit for controlling a current of said pre-charge line is provided on said apparatus; and wherein a connection sequence control means for performing connection of said pre-charge line before connection of a power line upon insertion of each of said plurality of disk units into a respective one of said plurality of connectors is provided on said respective one of said plurality of connectors formed on said mother board, thereby suppressing a variation in power voltage upon insertion of each of said plurality of disk units into said respective one of said plurality of connectors and enabling insertion of all of said plurality of disk units into said respective ones of said plurality of connectors by plugging without provision of said current control circuit on the side of each of said plurality of disk units.

24. A plural disk unit apparatus according to claim 20, wherein each of said plurality of disk units is provided with a motor and a motor stopping display circuit for detecting and displaying a motor stopping command therefor, thereby enabling disk unit removal after checking for stopping of the motor.

25. A plural disk unit apparatus according to claim 20, further comprising:

a connector unit directly connected to said mother board through one of said plurality of connectors formed on said mother board and having a connector for said control buses; and a terminal unit directly connected to said mother board through one of said plurality of connectors formed on said mother board and having a terminal circuit of said control buses.

26. A plural disk unit apparatus according to claim 20, further comprising a fan unit directly connected to said mother board through one of said plurality of connectors and having a fan for ventilating the interior of said apparatus.

27. A plural disk unit apparatus according to claim 20, further comprising a power unit for supplying operational power to said plurality of disk units, directly connected to said mother board through one of said plurality of connectors.

28. A plural disk unit apparatus according to claim 20, further comprising:

a plurality of connector units directly connected to said mother board through said plurality of connectors formed on said mother board, each of said plurality of connector units having a connector for said control buses; and a plurality of terminal units directly connected to said mother board through said plurality of connectors formed on said mother board, each of said plurality of terminal units having a terminal circuit of said control buses;

wherein each pair of one of said terminal units and one of said connector units are disposed adjacent to each other on said second main surface, and are replaceable with a bus connection unit for connecting a plurality of control buses to each other, thereby making variable the number of channels for controlling said control buses.

29. A plural disk unit according to claim 20, wherein at least one of said specified ones of a plurality of signals contained in said control buses is an acknowledge ACK signal.

* * * * *